United States Patent [19]

Beinor et al.

[11] Patent Number: 4,623,713

[45] Date of Patent: Nov. 18, 1986

[54] SOLVENT FRACTIONATION OF GUAYULE RUBBER

[75] Inventors: Robert T. Beinor, Uniontown; William M. Cole, Norton, both of Ohio

[73] Assignee: The Firestone Tire & Rubber Co., Akron, Ohio

[21] Appl. No.: 754,554

[22] Filed: Jul. 15, 1985

[51] Int. Cl.$^4$ ............................................. C08C 4/00
[52] U.S. Cl. ..................................... 528/930; 528/933
[58] Field of Search ............................. 528/930, 933

[56] References Cited

U.S. PATENT DOCUMENTS

| | | | |
|---|---|---|---|
| 2,390,860 | 12/1945 | Williams | 528/495 |
| 2,572,046 | 6/1950 | Meeks et al. | 528/930 |
| 2,618,670 | 11/1952 | Clark | 528/493 |
| 4,376,835 | 8/1983 | Kay et al. | 523/116 |
| 4,405,532 | 9/1983 | Gutierrez et al. | 524/253 |
| 4,435,337 | 3/1984 | Kay et al. | 528/493 |
| 4,526,959 | 7/1985 | Kay et al. | 528/930 |

*Primary Examiner*—Morton Foelak
*Assistant Examiner*—M. L. Moore
*Attorney, Agent, or Firm*—Daniel N. Hall

[57] ABSTRACT

A method and composition are disclosed wherein guayule rubber is fractionated into desirable weight average molecular weight fractions by a desired solvent system. Oftentime, a plurality of fractionating steps is utilized wherein the desirable molecular weight rubber fraction is precipitated or extracted. High weight average molecular weight rubbers having usually less than 4% by weight of resin content therein are generally desirable because of their favorable physical properties.

20 Claims, No Drawings

SOLVENT FRACTIONATION OF GUAYULE RUBBER

FIELD OF THE INVENTION

The present invention relates to solvent fractionation of guayule rubber. More specifically, the present invention relates to utilizing a solvent system to obtain a desirable weight average molecular weight fraction of guayule rubber.

BACKGROUND

Heretofore, guayule plants were subjected to various separation methods and processes whereby generally resin, rubber, or both were obtained. However, no process is known wherein the guayule rubber was fractionated into various molecular weight distributions.

U.S. Pat. No. 2,390,860 to Williams relates to purification of natural rubber plants via agitation utilizing a resin solvent having a rubber solvent therein. However, the amount of rubber solvent utilized therein is such that the mixture is not a rubber solvent. As a guideline, it is stated that the solvent mixture contains approximately three parts of a non-rubber solvent to about one part of a rubber solvent. Accordingly, this patent is not pertinent in that it fails to disclose any fractionation of the rubber portion from a solvent system, and the like.

U.S. Pat. No. 2,572,046 to Meeks et al relates to a process for recovering parthenyl cinnamate and essential oils from guayule resin. Generally, a two-phase solvent system is utilized wherein one phase contains a water-miscible organic solvent and the remaining phase is a hydrocarbon solvent. Usually a large amount of the miscible organic solvent is utilized. No disclosure is made of fractionating any rubber extraction to obtain a particular molecular weight distribution thereof.

U.S. Pat. No. 2,618,670 to Clark relates to a process for deresinating rubber from plants wherein partially water-miscible resin solvent is utilized such as methyl ethyl ketone. Although guayule rubber-bearing material is separated from a mixture containing the solvent, water, and guayule plants, no disclosure is made of fractionating a portion of said rubber material, or the like.

U.S. Pat. No. 4,376,835 to Kay and Gutierrez relates to a process for processing guayule plant material. U.S. Pat. No. 4,405,532 to Gutierrez, Kay and Serbin relates to a method of storing guayule material. U.S. Pat. No. 4,435,337 to Kay and Gutierrez relates to a process for extracting rubber and byproducts from guayule material. However, none of these patents disclose fractionating a portion of the guayule rubber material.

SUMMARY OF THE INVENTION

It is therefore an aspect of the present invention to provide a solvent fractionated guayule rubber having an acceptable amount of resin therein.

It is yet another aspect of the present invention to provide a solvent fractionated guayule rubber, as above, wherein multiple fractionations can be utilized.

It is a further aspect of the present invention to provide a solvent fractionated guayule rubber, as above, wherein high molecular weight fractions are readily obtained.

These and other aspects of the present invention will become apparent from the following specification. In general, a process for extracting a desired molecular weight fraction from a guayule rubber source comprises, forming a mixture of guayule rubber source with a solvent system, said solvent system having an effective ratio of polar to hydrocarbon solvents to yield a desired separation of a rubber; and separating said resulting mixture to obtain a desired molecular weight rubber fraction having a weight average molecular weight greater than said guayule source. Said organic polar solvent is selected from the group consisting of an alcohol having from 1 to 8 carbon atoms, an ester having from 3 to 8 carbon atoms, a ketone having from 3 to 8 carbon atoms, an ether having from 2 to 8 carbon atoms, and combinations thereof and said hydrocarbon solvent is selected from the group consisting of an alkane having from 4 to 9 carbon atoms, a cycloalkane having from 5 to 10 carbon atoms, an aromatic or an alkyl substituted aromatic having from 6 to 12 carbon atoms, and combinations thereof.

PREFERRED EMBODIMENTS AND BEST MODE OF THE INVENTION

Guayule rubber or similar rubber containing plants are initially prepared for extraction of the rubber and/or resin therein. These species include particularly guayule itself, gopher plant (*Euphorbia lathyris*), mariola (*Parthenium incanum*), rabbitbrush (*Chrysothamnus nauseosus*), candililla (*Pedilanthus macrocarpus*), Madagascar rubbervine (*Cryptostegia grandiflora*), milkweeds (*Asclepias syriaca, speciosa, subulata,* et al), goldenrods (*Solidago altissima, graminifolia, rigida,* et al), pale Indian plantain (*Cacalia atripilicifolia*), Russian dandelion (*Taraxacum Kok-Saghyz*), mountain mint (*Pycnanthemum incanum*), American germander (*Teucreum canadense*) and tall bellflower (*Campanula americana*). Many other plants which produce rubber and rubber-like hydrocarbons are known, particularly among the Compositae, Euphorbiaceae, Campanulaceae, Labiatae, and Moraceae families.

Generally, any conventional initial extraction method can be used whereby the plants are crushed and the cells ruptured. For example, whole plants, that is plants containing stems, branches, leaves and roots, can be initially shook to remove any loose dirt and then broken down in size as through shredding, grinding, cutting, crushing, and the like, into small pieces, as for example less than an inch and usually less than one-quarter inch in size. A suitable crushing and shredding device is a conventional hammer mill of one or more stages. Also a two roll mill can be used as a subsequent stage. In this manner, the entire plant is prepared for initial extraction.

Any one of a number of solvent rubber recovery methods can be used to extract the rubber and/or resin from the shredded plant material. For example, various types of hydrocarbon solvents can be used, such as alkanes, to remove the rubber from the plant. In such an extraction step, the entire broad molecular weight distribution of rubber is generally obtained. That is, the extracted rubber contains substantially all the rubber present regardless of its molecular weight.

According to the concepts of the present invention, guayule raw rubber is subjected to a solvent fractionation to obtain a desired molecular weight fraction thereof. The desired fraction can be narrow or broad as is further discussed herein below. By the term "fractionation" it is meant that any type of separation procedure such as precipitation, partition, dissolution of the particular rubber fraction, and the like. The solvent system of the present invention comprises a mixture of one or more organic polar solvents and one or more hydrocarbon solvents. The amount of organic polar solvent can vary widely depending upon the molecular weight range of the desired fraction and is an effective amount such that a fraction of the rubber is extracted containing a weight average molecular weight greater than that of unfractionated rubber. Additionally, the amount of organic polar solvent will vary from type to type of solvent and the like. With regard to a pentane-acetone system at 25° C., a suitable amount of the acetone solvent is from about 40% to about 60% by weight with from about 42% to about 50% by weight being preferred. Accordingly, the amount of pentane solvent is the remaining difference. Other systems can contain similar amounts. Should the solvents not be thoroughly miscible, it is important that agitation be utilized.

The organic polar solvents include alcohols having from 1 to 8 carbon atoms such as ethanol, isopropanol, methanol, and the like. Esters having from 3 to 8 carbon atoms can also be utilized such as the various formates, the various acetates, the various proprionates, and the like. The ketones constitute yet another suitable organic polar solvent such as those having from 3 to 8 carbon atoms, for example acetone, methyl ethyl ketone, and the like. Ethers can also be utilized such as those having from 2 to 8 carbon atoms including dimethyl ether, diethyl ether, and the like, as well as cyclic ethers having from 4 to 8 carbon atoms such as tetrahydrofuran. Acetone is the preferred polar solvent.

The hydrocarbon solvents include alkanes having from 4 to 9 carbon atoms such as heptane, nonane, hexane, and preferably pentane. Other hydrocarbon solvents include the cycloalkanes having from 5 to 10 carbon atoms such as cyclohexane, cyclopentane, and the like. Additionally, the aromatics or alkyl substituted aromatics can be utilized such as those having from 6 to 12 carbon atoms. Suitable examples include benzene, xylene, toluene and the like.

As noted above, the guayule rubber which is subjected to the solvent fractionation process of the present invention, can be obtained from any conventional process and often includes not only the rubber, but a sizeable amount of resin therein. Often the rubber-resin material is contained in a miscella solution. By miscella is meant a solution of the rubber and/or resin which contains one or more solvents utilized to extract the rubber and/or resin along with any water derived from the guayule plants.

One method of separating out a specific desirable rubber fraction (that is, a fraction of the rubber containing a weight average mol. wt. greater than that of the unfractionated rubber) involves utilizing an initial amount of polar solvent less than that which causes rubber precipitation to commence. This percentage of polar solvent will depend on the choice of solvents. That is, an excessive amount of hydrocarbon solvent is initially contained in the solution. Accordingly, such a solvent composition can be added to the rubber and resin mixture or such solvent mixture can exist in a miscella. In any event, a small amount of the polar solvent is slowly added over a period of time, usually with agitation of the solution, until a desirable end ratio of organic polar solvent to hydrocarbon solvent is obtained. Upon reaching a specific percentage of organic polar solvent in the solvent system, high molecular weight rubber will commence precipitating out of solution. Generally, as the addition of organic polar solvent continues, the rubber precipitating out is of a gradually lower weight average molecular weight. Thus, by controlling the final end point ratio of the polar solvent and hydrocarbon solvent, the average molecular weight of the recovered rubber can essentially be tailormade. In other words, the increase in the average molecular weight of the recovered rubber can be controlled by varying the end ratio of the polar and hydrocarbon solvents.

Generally, rubber having a high weight average molecular weight, is desirable. This is because of desirable properties which will be more fully discussed hereinbelow. As a very rough approximation, such high weight average molecular weight rubber fractions can be classified as having a weight average molecular weight of at least one million, and preferably greater than 1.3 million. Thus, the amount of organic polar solvent added is such that the overall end point ratio is adequate to produce a rubber fraction with a weight average molecular weight of at least one million. The molecular weight is usually determined by gel permeation chromatography.

To obtain a relatively high purity product, that is a rubber fraction generally containing 6% or less by weight of resin therein, desirably 4% or less by weight, and preferably 2% or less by weight, multiple solvent fractionation steps are often utilized. In other words, upon completion of an initial fractionation step as set forth above, the particular rubber fraction obtained can be further fractionated by repeating the same method or by utilizing any other method such as those set forth herein. The total number of fractionations is usually 2 to 6. The initial high molecular weight rubber fraction can be recovered by removing the solvent in any conventional manner, as by filtration, sedimentation, centrifugation and the like.

A continuous, countercurrent method is generally preferred in that lesser amounts of solvent are required and hence the cost of carrying out the overall solvent fractionation procedure is thereby reduced. Although less desirable, a batch process can be utilized with larger amounts of solvent being added over longer time periods.

Another method of achieving solvent fractionation of guayule rubber is to utilize a solvent system having an amount of polar organic solvent in excess of the amount required for total rubber precipitation. When such a solvent system is added to guayule rubber and/or resin or a miscella solution thereof, essentially all of the rubber molecules are precipitated out. Then, small amounts of the hydrocarbon solvent are added to the guayule rubber-solvent system to achieve a desired overall solvent end ratio. As the hydrocarbon solvent is added, the various low molecular weight rubber molecules are generally dissolved until, when the end ratio is achieved, the high molecular weight rubber molecules remain undissolved. Such high molecular weight molecules can be separated out by any conventional manner, as by filtration, sedimentation, centrifugation, and the like. As before, more than one solvent fractionation step of any fractionation method can be utilized to achieve a high degree of purity (low resin content) as noted above.

Additionally, it has been found that fractionations can be carried out at temperatures other than at ambient as lower or elevated such as from less than 0° C. to above 60° C. The solubility characteristics of the various weight average molecular weight fractions of rubber generally vary with temperature as in the acetone/pentane system. That is, at temperatures approaching 50° C. and above, the solubility of the low weight average molecular weight rubber fraction is more sensitive to changes in the solvent composition than the solubility of the high weight average molecular weight rubber fraction. This trend makes fractionating guayule rubber at elevated temperatures more desirable for a cleaner separation of the weight average molecular weight fractions. For example, at 50° C. a weight average molecular weight rubber fraction of 1,500,000 might require approximately a 50% solution by weight of polar solvent, while a low weight average rubber fraction of 500,000 or less might require a 56% solution by weight of polar solvent or a 6% difference in composition. The identical fractions at 0° C. might require a 47% and 50% by weight of polar solvent respectively. At the lower temperature the differences are decreased, making separation more difficult. In general, higher temperatures require slightly higher amounts of polar solvent, e.g. about 2 to 8%.

Temperature can also be utilized to fine tune fractionation. Increasing the fractionation temperature increases the solubility of the low weight average molecular weight rubber fractions allowing a purer high weight average molecular rubber fraction to be obtained as a residue. This trend will also allow fine tuning the process via temperature to compensate for changing feed sources without changing the solvent composition.

The high molecular weight guayule rubber obtained by the present invention is desirable in that it generally imparts good performance properties as well as good physical properties to various articles and components utilizing the same. Accordingly, the high molecular weight guayule rubber can be utilized in pneumatic tires, especially automotive tires, sealants, and sometimes in hoses, gaskets and coatings. They are especially desirable in tires due to their improved wear and cut growth resistant properties.

The present invention will be better understood by reference to the following examples.

EXAMPLE I

A solvent solution of 100 grams of a 20% total solids (T.S.) resin and rubber miscella, 4:1 ratio of pentane to acetone by weight, was poured into a 200 ml centrifuge bottle. An additional 41 grams of acetone was added and the bottle was sealed with a septum cap. Then, the bottle contents were agitated for 1.5 hours on a rotary shaker and centrifuged 15 minutes at 1000 rpm. After decantation of the upper liquid layer, 87 grams of a solvent mixture comprising 51% pentane and 49% acetone by weight was added to the bottle. The contents of the bottle were agitated for 1.25 hours on the shaker, centrifuged as above, and the upper liquid phase decanted. The above sequence was repeated twice more. Finally, 20 grams of acetone were added to the lower solids phase, the bottle agitated and the solids recovered. The liquid from all of the previous steps was combined and stripped evaporatively of solvent. The fraction thus recovered contained the low molecular weight rubber, 4.1 grams on a dry weight basis. The undissolved solids phase contained a high molecular weight fraction of the rubber, 2.1 grams on a dry weight basis.

A control experiment was run to obtain the non-fractionated rubber from the same miscella source. That is, 100 grams of the miscella were mixed with 300 grams of acetone in a closed system for 2.5 hours. The solution was filtered and the rubber solids were mixed with an additional 100 grams of acetone for 1 hour. This solution was then filtered and the two liquid phases ere combined. The rubber solids and the liquid phase were vacuum dried. The rubber solid phase contained 99.6% of the total rubber available in the miscella.

The rubber from the control had a weight average molecular weight of 0.84 million and contained 2.8% resin therein. In contrast thereto, the high molecular weight rubber fraction obtained in the manner as set forth above had a weight average molecular weight of 1.34 million as determined by gel permeation chromatography and contained 2.3% resin. This example shows that the process of the present invention successfully fractionates out high molecular weight rubber from miscella with a low residual resin content.

EXAMPLE II

Ten grams of guayule rubber containing 2.7% resin and having a weight average molecular weight of 0.87 million were mixed with 190 grams of solvent solution, 51.5% pentane and 48.5% acetone by weight. The mixture was agitated until the soluble portion of the rubber completely dissolved. The mixture was allowed to settle and the top liquid phase decanted. Fresh solvent solution was added to the lower rubber rich phase in an amount equal in volume to that which was decanted. The mixture was agitated for 15 minutes, settled for 15 minutes and then decanted. The above procedure was repeated twice more with fresh solvent solution. Both the rubber rich phase and the decanted phase were dried under vacuum to recover solid dried rubber.

The rubber rich phase contained 4.5 grams of rubber of 1.2% resin content and a weight average molecular weight of 1.49 million. The decanted phase contained 5.5 grams of rubber of a weight average molecular weight of 0.27 million.

This example shows that low weight average molecular weight rubber can be dissolved from guayule rubber resulting in a high weight average molecular weight rubber fraction.

EXAMPLE III

Various weight average molecular weight (Mw) rubber fractions were obtained from a single initially non-fractionated source of guayule rubber. These fractions each contained less than 1% resin by weight. Fraction A had a Mw=1.6 million. Fraction B had an Mw=1.2 million, and Fraction C had a Mw=0.34 million. The percent of polar solvent (acetone) to hydrocarbon solvent (pentane) that solubilized each fraction at various temperatures between 0° C. and 50° C. was determined. These data were plotted, resulting in a figure similar to the one below.

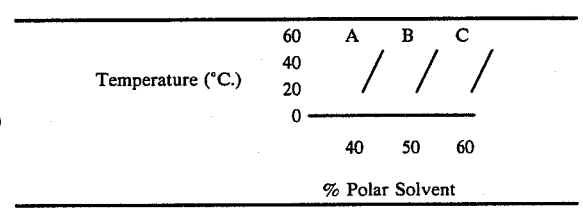

This example shows that increasing the temperature at a given ratio of polar to hydrocarbon solvent will increase the solubility of the low weight average molecular weight rubber and help increase the overall yield of high weight average molecular weight rubber. Also elevated temperatures generally give greater solubility differences between high and low Mw fractions.

While in accordance with the patent statutes, a best mode and preferred embodiment has been set forth, the scope of the invention is not limited thereto, but rather by the scope of the attached claims.

What is claimed is:

1. A process for solvent fractionating a molecular weight rubber fraction from a guayule rubber source; comprising the steps of:

forming a mixture of the guayule rubber source and a solvent system, said solvent system having an effective end ratio of polar to hydrocarbon solvents to yield a separation of a desired molecular weight rubber fraction, said organic polar solvent selected from the group consisting of an alcohol having from 1 to 8 carbon atoms, an ester having from 3 to 8 carbon atoms, a ketone having from 3 to 8 carbon atoms, an ether having from 2 to 8 carbon atoms, and combinations thereof, said hydrocarbon solvent selected from the group consisting of an alkane having from 4 to 9 carbon atoms, a cycloalkane having from 5 to 10 carbon atoms, an aromatic or an alkyl substituted aromatic having from 6 to 12 carbon atoms, and combinations thereof; and separating said resulting mixture and obtaining a molecular weight rubber fraction having a weight average molecular weight greater than that of said guayule rubber source.

2. A process according to claim 1, wherein said guayule source includes a guayule rubber-resin mixture.

3. A process according to claim 2, wherein said rubber fraction contains 6% or less by weight of guayule resin therein.

4. A process according to claim 3, including subjecting said rubber fraction to at least one or more additional fractionating steps by repeating the process of claim 1 for each said additional step.

5. A process according to claim 4, wherein said rubber fraction contains 4% or less by weight of guayule resin therein.

6. A process according to claim 5, wherein said organic polar solvent is selected from the group consisting of ethanol, methanol, isopropanol, a formate, an acetate, a proprionate, acetone, methyl ethyl ketone, dimethyl ether, diethyl ether, tetrahydrofuran, and combinations thereof, and wherein said hydrocarbon solvent is selected from the group consisting of pentane, hexane, heptane, octane, nonane, cyclohexane, cyclopentane, benzene, xylene, toluene, and combinations thereof.

7. A process according to claim 6, wherein said polar solvent is acetone, wherein said hydrocarbon solvent is pentane, wherein the amount of said polar solvent is from about 40% to about 60% by weight and wherein the amount of said hydrocarbon solvent is from about 60% to about 40% by weight at approximately 25° C., and wherein said rubber fraction contains 2% or less by weight of guayule resin therein.

8. A process according to claim 1, including conducting said process at elevated temperatures.

9. A process according to claim 4, including conducting said process at elevated temperatures.

10. A process according to claim 7, including conducting said process at elevated temperatures.

11. A process according to claim 1, wherein the weight average molecular weight of said rubber fraction is greater than 1,000,000.

12. A process according to claim 4, wherein the weight average molecular weight of said rubber fraction is greater than 1,000,000.

13. A process according to claim 7, including forming said solvent system having a ratio of polar to hydrocarbon solvent less than said effective end ratio and including adding polar solvent to said solvent system until said effective end ratio of polar to hydrocarbon solvent is achieved, and wherein the weight average molecular weight of said rubber fraction is greater than 1,300,000.

14. A process according to claim 8, including forming said solvent system having a ratio of polar to hydrocarbon solvent less than said effective end ratio and including adding polar solvent to said solvent system until said effective end ratio of polar to hydrocarbon solvent is achieved, and wherein the weight average molecular weight of said rubber fraction is greater than 1,000,000.

15. A process according to claim 10, including forming said solvent system having a ratio of polar to hydrocarbon solvent less than said effective end ratio and including adding polar solvent to said solvent system until said effective end ratio of polar to hydrocarbon solvent is achieved, and wherein the weight average molecular weight of said rubber fraction is greater than 1,300,000.

16. The solvent fractionated guayule rubber produced by the process of claim 1.

17. The solvent fractionated guayule rubber produced by the process of claim 4.

18. The solvent fractionated guayule rubber produced by the process of claim 7.

19. The solvent fractionated guayule rubber produced by the process of claim 9.

20. The solvent fractionated guayule rubber produced by the process of claim 13.

* * * * *